United States Patent [19]
Kliman

[11] Patent Number: 5,465,019
[45] Date of Patent: Nov. 7, 1995

[54] HIGH-EFFICIENCY, LOW-NOISE ELECTRONICALLY COMMUTATED MOTOR HAVING IMPROVED STARTING CAPABILITY

[75] Inventor: Gerald B. Kliman, Schenectady, N.Y.

[73] Assignee: General Electric Company, Schenectady, N.Y.

[21] Appl. No.: 123,668

[22] Filed: Sep. 20, 1993

[51] Int. Cl.⁶ .............................. H02K 37/00; H02P 5/06
[52] U.S. Cl. .................................. 310/156; 310/40 MM; 310/49 R
[58] Field of Search .......................... 310/156, 40 MM, 310/49 R, 259, 261

[56] References Cited

U.S. PATENT DOCUMENTS

| | | | |
|---|---|---|---|
| 2,120,109 | 6/1938 | Merrill | 171/209 |
| 3,579,161 | 5/1971 | Kremzner et al. | 335/272 |
| 4,095,130 | 6/1978 | Oshima et al. | 310/162 |
| 4,214,181 | 7/1980 | Nagahori | 310/162 |
| 4,369,385 | 1/1983 | Malkin et al. | 310/49 R |
| 4,404,484 | 9/1983 | Gillott | 310/49 R |
| 4,455,516 | 6/1987 | Furusho | 318/254 |

*Primary Examiner*—Steven L. Stephan
*Assistant Examiner*—D. R. Haszko
*Attorney, Agent, or Firm*—Jill M. Breedlove; Marvin Snyder

[57] ABSTRACT

A single-phase ECM in a radial flux configuration has parking magnets situated on both ends of its rotor and parking lamination extensions situated on its stator, such that the parking magnets and parking lamination extensions interact to provide sufficient starting torque from rest at predetermined parking positions. As a result, the parking and torque production functions in the ECM are separated; and the ECM has good starting capability while operating at relatively high torque production and efficiency with minimal torque pulsations and noise.

9 Claims, 2 Drawing Sheets

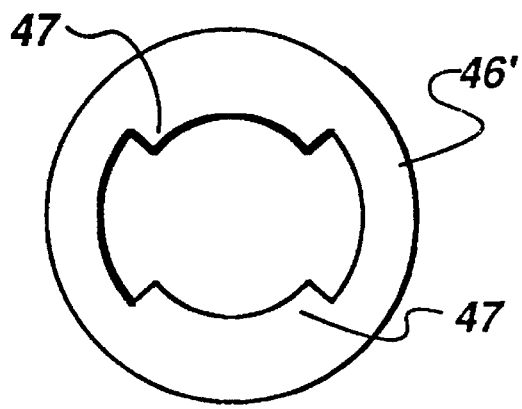
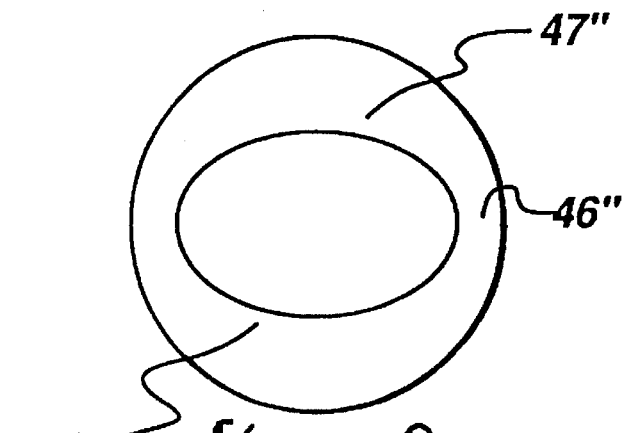
fig. 5
fig. 6
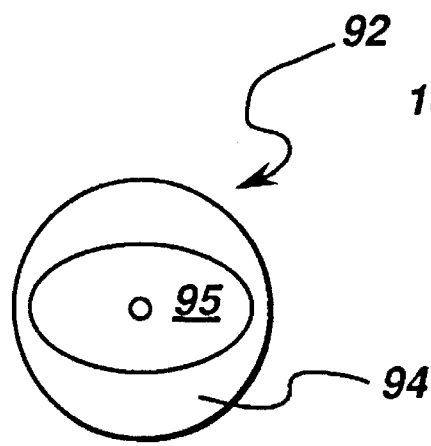
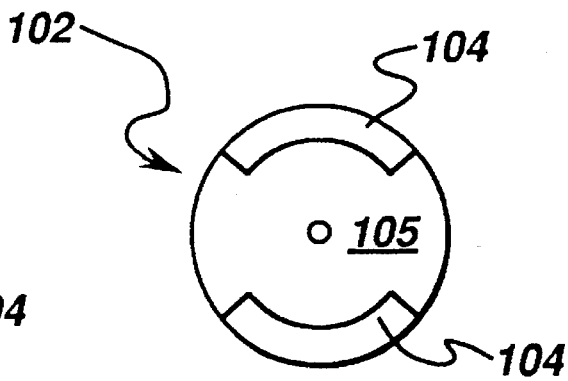
fig. 7
fig. 8

HIGH-EFFICIENCY, LOW-NOISE ELECTRONICALLY COMMUTATED MOTOR HAVING IMPROVED STARTING CAPABILITY

FIELD OF THE INVENTION

The present invention relates generally to electronically commutated motors and, more particularly, to a single-phase electronically commutated motor having improved starting capability, while producing high torque output at high efficiency and low noise.

BACKGROUND OF THE INVENTION

An electronically commutated motor (ECM), also referred to as a brush less DC motor, has permanent magnets mounted on its rotor. The stator of an ECM has teeth and coil windings wound thereon, which interact with the permanent magnet rotor to produce positive or negative torque, depending on the direction of current therein with respect to the magnetic polarities. An electronic inverter is employed to energize the stator windings and thus control the amount and direction of torque as well as the rotor shaft speed.

Single-phase ECM's typically have starting problems. The magnetic saliencies caused by the stator teeth result in a cogging, or indenting, torque which forces the permanent magnet rotor to rest, or park, at particular positions. Unfortunately, in single-phase ECM's, the parking positions may coincide with positions of zero electromechanical torque production, thus making it difficult to start. One way to overcome this problem is to provide a starting winding. Another approach is to employ parking cuts in the stator. Parking cuts provide cogging torques adjusted for stopping the rotor at predetermined positions wherein there is sufficient torque to start the motor. Disadvantageously, however, such parking cuts typically reduce electromagnetic torque production and efficiency as well as introduce torque pulsations and noise.

Accordingly, it is desirable to provide an ECM having improved starting capability, while producing high torque output at high efficiency and low noise.

SUMMARY OF THE INVENTION

A single-phase ECM in a radial flux configuration has parking magnets situated on both ends of its rotor and parking lamination extensions situated on its stator, such that the parking magnets and parking lamination extensions interact to provide sufficient starting torque from rest at predetermined parking positions. As a result, the parking and torque production functions in the ECM are separated; and the ECM has good starting capability while operating at relatively high torque production and efficiency with minimal torque pulsations and noise. Moreover, in order to further minimize interaction with air gap fields, the parking lamination extensions may have a substantially U-shaped bend formed therein.

In an alternative embodiment, the parking magnets comprise auxiliary magnets spatially separated from the main permanent magnet on an extended rotor core.

In another alternative embodiment, parking magnets are situated on the ends of the rotor; and parking magnet laminations on the stator, and/or the parking magnets, are shaped so as to provide a smooth variation of flux density.

In still other alternative embodiments, parking magnets and parking lamination extensions are employed, but the parking magnets are situated in predetermined positions on the ends of the rotor corresponding to the desired parking positions, rather than extending the parking magnets about the entire rotor core.

BRIEF DESCRIPTION OF THE DRAWINGS

The features and advantages of the present invention will become apparent from the following detailed description of the invention when read with the accompanying drawings in which:

FIG. 5 is a front view of one embodiment of an ECM stator parking lamination according to the present invention;

FIG. 6 is a front view of an alternative embodiment of an ECM stator parking lamination according to the present invention;

FIG. 7 is a front view of an alternative embodiment of an ECM rotor according to the present invention; and FIG. 8 is a front view of an alternative embodiment of an ECM rotor according to the present invention.

DETAILED DESCRIPTION OF THE INVENTION

Figure 1:
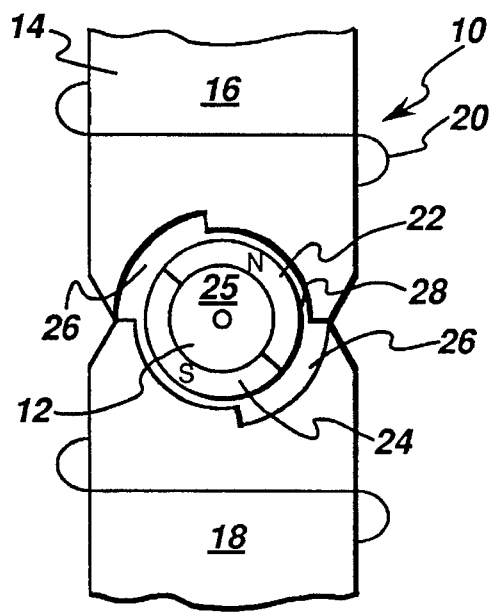
FIG. 1 is a front view of an exemplary two-pole, single-phase ECM in a typical radial flux configuration.

FIG. 1 illustrates a conventional single-phase ECM 10 in a typical radial flux configuration with rotor 12 and stator 14 having two poles, or teeth, 16 and 18 with stator windings 20 wound thereon. Although only two poles are shown, the present invention applies to ECM's having any number of poles. Rotor 12 has a permanent magnet with poles 22 and 24 situated on the periphery of a rotor core 25. Stator 14 includes two parking cuts 26 for providing cogging torques such that the rotor stops at particular positions for which there is sufficient starting torque to start the motor from rest. Unfortunately, the parking cuts result in a non-uniform air gap 28, thus reducing electromagnetic torque production and efficiency in addition to increasing torque pulsations and noise.

In accordance with the present invention, in contrast to ECM 10 of FIG. 1, the parking function is removed from the air gap by eliminating the parking cuts, thereby providing a relatively uniform air gap. Advantageously, therefore, electromagnetic torque production and efficiency are relatively high, and torque pulsations and noise are relatively low.

Figure 2A:
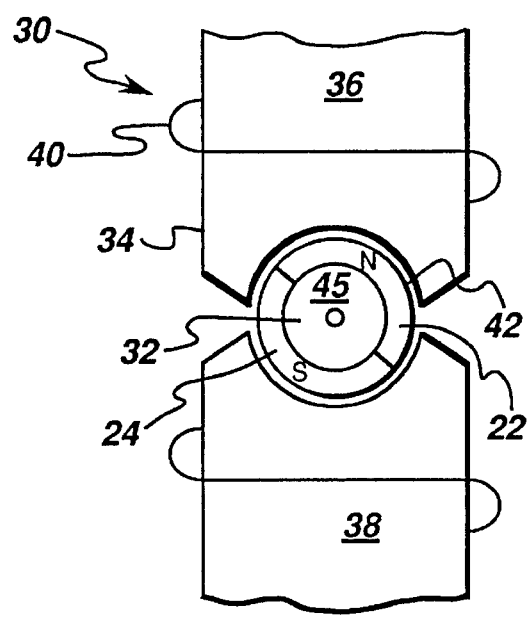
FIG. 2a is a front view of an ECM according to one embodiment of the present invention.
Figure 2B:
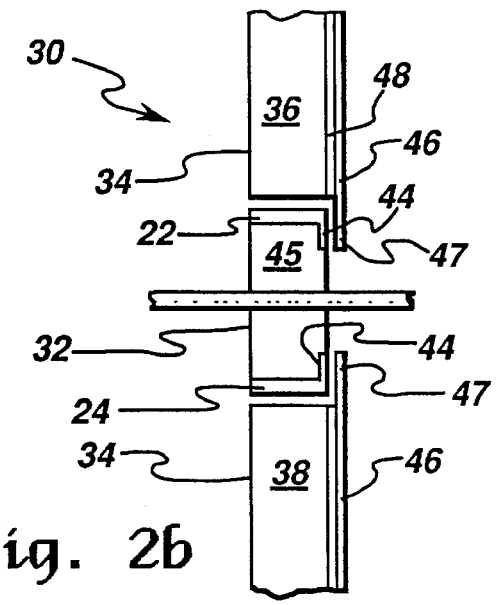
FIG. 2b is a side view of an ECM, including the stator of FIG. 2a and further including stator parking lamination extensions and rotor parking magnets in accordance with the present invention.

FIGS. 2a and 2b illustrate an ECM 30 according to one embodiment of the present invention having a rotor 32, a stator 34 with teeth 36 and 38, stator winding 40, and a relatively uniform air gap 42 in accordance with the present invention.

As shown in FIG. 2b, rotor 32 includes parking magnets 44 on one end thereof. Rotor 32 may comprise either a solid or laminated core 45. In addition, stator 34 includes a stator parking lamination 46 with parking lamination extensions 47 which interact with parking magnets 44 such that there is sufficient starting torque at predetermined parking positions. Parking lamination extensions 47 may comprise the extension of a single stator parking lamination 46, as shown, or, alternatively, may comprise extensions of two or more adjacent stator laminations, depending on the desired thickness of the laminations. Preferably, as shown, stator parking lamination 46, with extensions 47, is separated from the main portion of the stator by a non-magnetic spacer 48. In this way, the separation of the parking and torque production functions is further insured. Still further to this end, the parking lamination extensions should not link the stator windings.

Figure 2C:
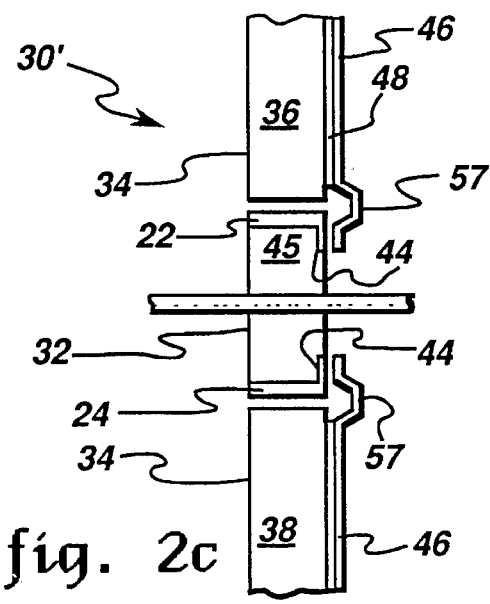
FIG. 2c is an alternative embodiment of the ECM illustrated in FIG. 2b.

FIG. 2c is a side view of an alternative embodiment of the ECM of FIG. 2b. In particular, ECM 30' of FIG. 2c includes substantially U-shaped parking lamination extensions 57, further minimizing interaction with electromagnetic fields in the air gap.

Figure 3:
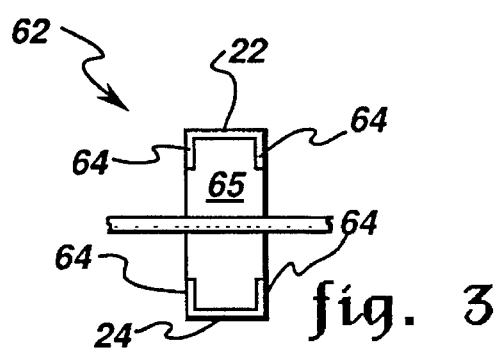
FIG. 3 is a side view of an alternative embodiment of an ECM rotor according to the present invention.

FIG. 3 illustrates an alternative embodiment of an ECM rotor 62 constructed in accordance with the present invention having a rotor core 65 with parking magnets 64 disposed on both ends thereof. Rotor 62 would fit into the stator configuration of FIG. 2b or 2c such that parking magnets 64 interact with parking lamination extensions 47 (FIG. 2b) or 57 (FIG. 2c) on both sides of the stator to provide sufficient starting torque at predetermined parking positions.

Figure 4:
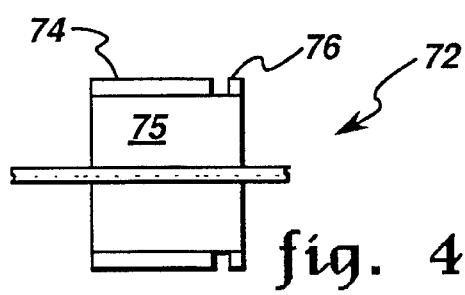
FIG. 4 is a side view of an alternative embodiment of an ECM rotor according to the present invention.

FIG. 4 illustrates another alternative embodiment of an ECM rotor 72 wherein parking magnets 76 comprise auxiliary magnets spatially separated from the permanent magnet 74 on the periphery of an extended rotor core 75.

A preferred way to construct a rotor for an ECM of the present invention is to use the method described in commonly assigned U.S. patent application Ser. No. 08/038,745 of Kliman and Richter, filed Mar. 22, 1993, which is incorporated by reference herein, and merely extend the molded permanent magnets to form the parking magnets. In particular, Kliman and Richter describe a permanent magnet rotor comprising a core of high magnetic permeability having thin permanent magnets, which are constructed to have high flux density, molded thereon. The permanent magnets comprise a mixture of magnetic particles (e.g., neodymium-iron-boron powder) and non-magnetic particles (e.g., a plastic or an epoxy). The volume fraction of the magnetic particles in the mixture and the thickness of the permanent magnets are jointly optimized to minimize the amount of the magnetic material required to achieve a predetermined magnetic flux density. This construction minimizes the rotor cost as little additional material is required, and the molding is all done at once.

FIG. 5 is a front view illustrating one embodiment of an ECM stator parking lamination 46' according to the present invention. FIG. 6 is a front view illustrating an alternative embodiment of an ECM stator parking lamination 46" according to the present invention. Instead of the sharply defined parking magnet extensions 47 of FIG. 5, the stator parking lamination 46" of FIG. 6 is oval-shaped such that the extensions 47" comprise the portion of lamination 46" which overlap the parking magnets on the rotor. Advantageously, the oval-shaped parking magnet lamination of FIG. 6 provides a substantially smooth variation of flux density.

FIG. 7 illustrates another alternative embodiment of a rotor 92 for an ECM according to the present invention with an oval-shaped parking magnet 94 situated on rotor core 95 and extending all the way around the rotor.

FIG. 8 illustrates another alternative embodiment of a rotor 102 for an ECM according to the present invention with parking magnets 104 situated on predetermined positions on a rotor core 105 corresponding to the desired parking positions, as shown, rather than extending the parking magnets about the entire rotor core. Hence, less magnetic material is required.

Any of the rotor configurations described hereinabove with respect to FIGS. 2, 3, 4, 7 and 8 can be suitably employed with either of the stator parking laminations of FIGS. 5 and 6 to separate the parking and torque production functions in an ECM and to thus provide a relatively uniform air gap.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A single-phase electronically commutated motor (ECM), comprising:

a permanent magnet rotor having a plurality of magnetic poles situated on an outer surface of a cylindrical rotor core, said rotor including a parking magnet disposed on at least one of two ends of said rotor core; and a stator situated about said rotor with an air gap therebetween, said stator having a winding, said stator having at least one parking magnet lamination extending through said air gap and overlapping said parking magnet for interaction therewith, such that there is sufficient starting torque at predetermined parking positions of said rotor.

2. The ECM of claim 1 wherein said at least one parking magnet lamination has a substantially U-shaped portion at a location corresponding to that of said air gap.

3. The ECM of claim 1 wherein said at least one parking magnet lamination is shaped so as to provide a substantially smooth variation of flux density.

4. The ECM of claim 1, further comprising a non-magnetic layer between said at least one parking magnet lamination and said stator.

5. The ECM of claim 1 wherein said parking magnets extend around the entire rotor core.

6. The ECM of claim 1 wherein said parking magnets are situated in predetermined positions on said rotor core corresponding to said predetermined parking positions of said rotor.

7. The ECM of claim 1 wherein said at least one parking magnet lamination does not overlap said winding to avoid linking thereof.

8. The ECM of claim 1 wherein said parking magnet is molded onto said rotor core.

9. The ECM of claim 1 wherein a parking magnet is disposed on each of the two ends of said rotor core, each said parking magnet being molded thereto.

\* \* \* \* \*